Oct. 20, 1970     S. E. MILLER     3,535,017
OPTICAL FIBER WAVEGUIDE STRUCTURES
Filed Jan. 8, 1968     3 Sheets-Sheet 1

INVENTOR
S. E. MILLER
BY
Wilford L. Wisner
ATTORNEY

Oct. 20, 1970 S. E. MILLER 3,535,017
OPTICAL FIBER WAVEGUIDE STRUCTURES
Filed Jan. 8, 1968 3 Sheets-Sheet 2
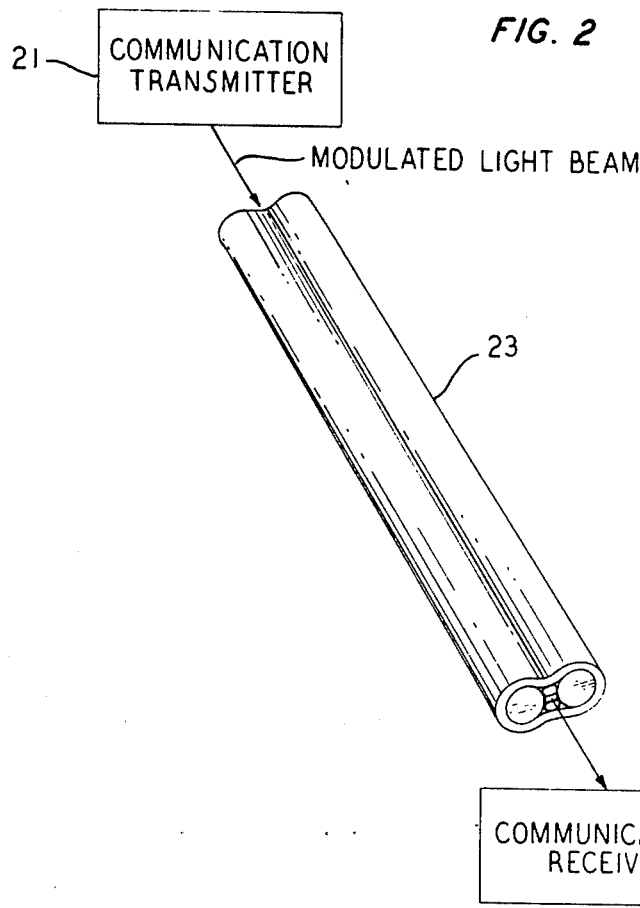
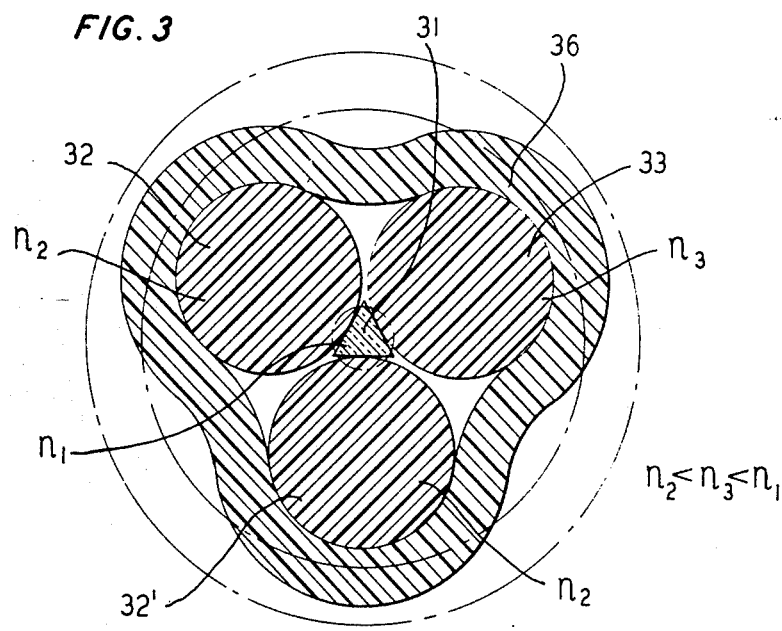

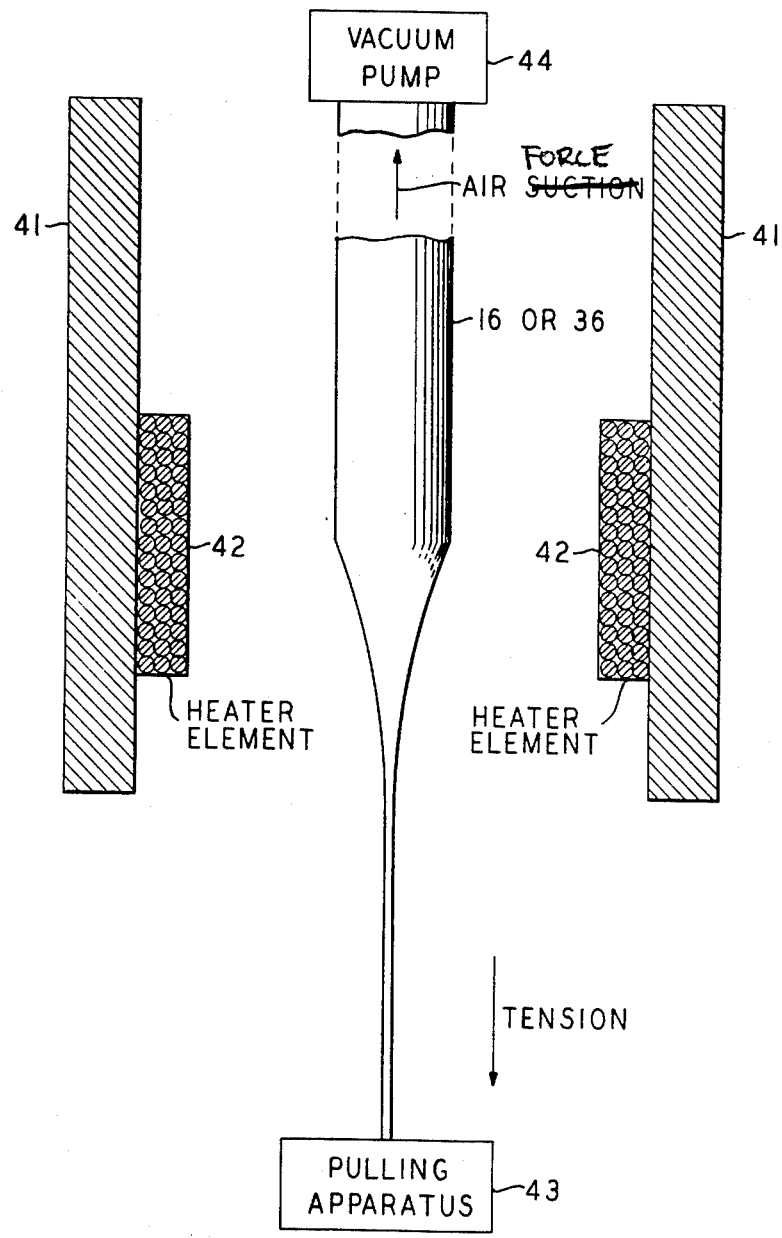

United States Patent Office 3,535,017
Patented Oct. 20, 1970

3,535,017
OPTICAL FIBER WAVEGUIDE STRUCTURES
Stewart E. Miller, Middletown Township, Monmouth, N.J., assignor to Bell Telephone Laboratories, Incorporated, Murray Hill and Berkeley Heights, N.J., a corporation of New York
Filed Jan. 8, 1968, Ser. No. 696,298
Int. Cl. G02b 5/14
U.S. Cl. 350—96          7 Claims

ABSTRACT OF THE DISCLOSURE

A multiplicity of relatively low refractive index spacer fiber members provide support for a higher index central-most optical guiding fiber and are bound in surrounding relationship with the guiding fiber by collapsing a vacuum-tight containing member thereover during the drawing operation. A single-mode transmission characteristic useful in communication is provided by asymmetry of the assembled guiding structure in orthogonal coordinates. The assymmetry may be produced in the guiding fiber itself by collapse of the containing member if the spacer members are of unequal dimensions along orthogonal coordinates of the guiding fiber; or the asymmetry may be produced by unequal indices of refraction in those respective spacer members nearest to the guiding fiber along its orthogonal coordinates. Spacer members are much thicker than the guiding fiber in order to provide the degree of isolation needed for optical communication.

BACKGROUND OF THE INVENTION

This invention relates to optical fiber devices suitable for use as a medium for the transmission of light, particularly information-modulated coherent light.

In proposed optical communication systems, some form of transmission medium is sought which will protect the modulated light beam from weather and other interference. Transmission in a protective conduit of relatively large cross section with periodic refocusing of the beam is one type of system presently being investigated. Another type is a true waveguide type of system in which the dimensions of the guiding structure are of the order of the optical wavelength. Investigation of the latter type of system has primarily been directed to improvements of optical fiber devices.

Such devices typically employ a very low-loss glass of relatively high refractive index surrounded by low-loss glass of a lower refractive index.

For optical communication over relatively long distances, the fiber should be provided with sufficient support and structural strength to be readily handled. In addition, it should be capable of being combined into bundles for multiple channel communication systems with negligible "crosstalk" between the channels.

Pior art optical fiber devices employing bundles of optical fibers in display apparatuses do not typically satisfy the rigorous requirements for a long distance optical communication system.

SUMMARY OF THE INVENTION

My invention provides a multiplicity of spacer fiber members surrounding a higher refractive index central fiber and a substantially vacuum-tight containing member substantially conformed to the adjacent surfaces of the spacer members and also provides an asymmetric relationship of the spacer members of the central fiber in orthogonal coordinates. The asymmetric relationship may be provided either by an asymmetric deformation of the higher index fiber, advantageously occurring during collapse of the containing member during a drawing operation, or by unequal indices of refraction among the surrounding spacer fibers in an arrangement that provides the asymmetry.

Asymmetry removes mode degeneracy of the central fiber and thereby insures single-mode transmission. The multiplicity of spacer fiber members, preferably all of low optical loss, and the vacuum tight containing member, preferably optical lossy, provide transverse dimensions of the assembled structure approximately an order of magnitude larger than the transverse dimensions of its central fiber, thereby providing adequate optical isolation for communication and strength for ease of handling.

BRIEF DESCRIPTION OF THE DRAWING

A more complete understanding of my invention may be obtained from the following detailed description, taken together with the drawing, in which:

FIG. 2 is a partially pictorial and partially block diagrammatic illustration of a communication system employing an optical fiber device according to my invention;

FIG. 3 is a cross-sectional view of another optical fiber device according to my invention; and FIG. 4 is a partially pictorial and partially block diagrammatic illustration of a typical fiber drawing apparatus suitable for making optical fibers for use according to my invention.

DESCRIPTION OF ILLUSTRATIVE EMBODIMENTS

Figure 1:
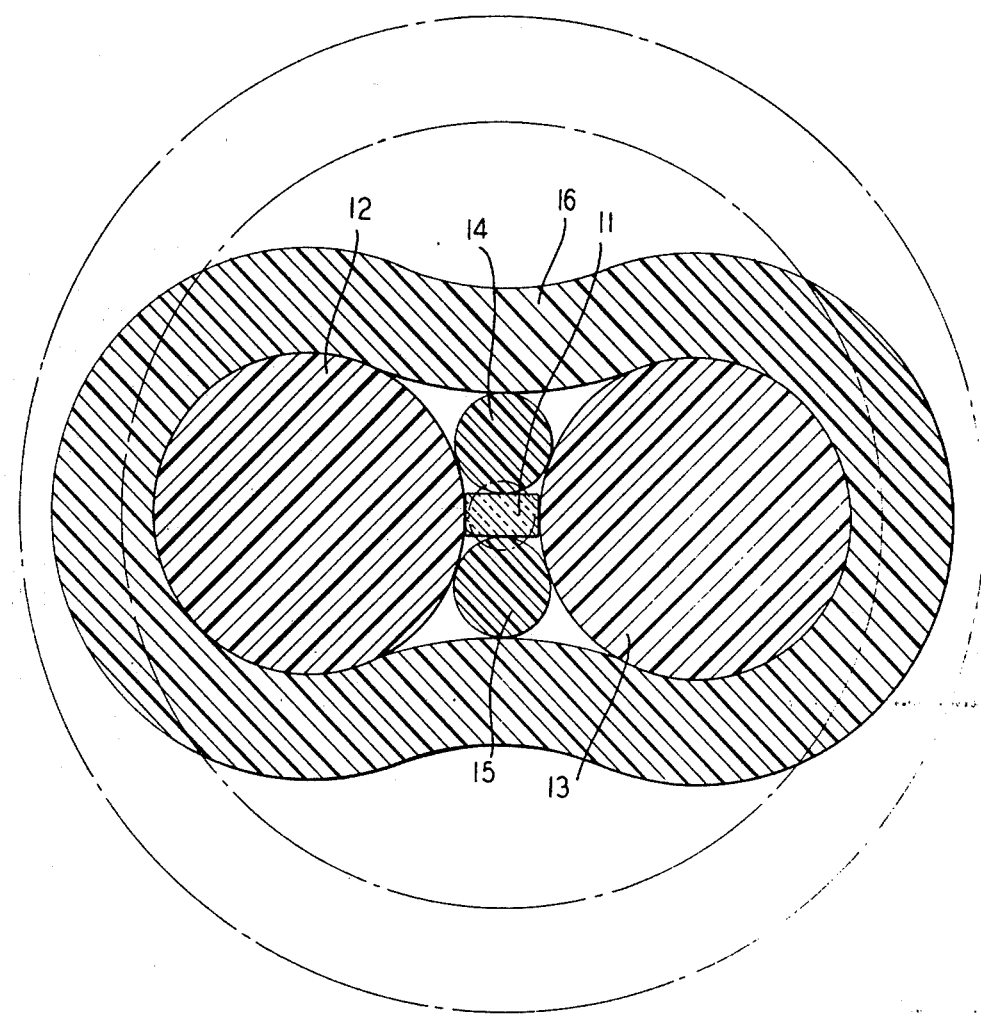
FIG. 1 is a cross-sectional view of an illustrative optical fiber device according to my invention.

In FIG. 1, the starting stock employed will typically have transverse dimensions much larger than the corresponding parts in the finished device. For purposes of illustration, the initial shape of the substantially deformed components of the device are shown dotted, but with transverse dimensions not significantly different from the finished dimensions. That is, the dotted lines are intended to represent initial shape only, and not size.

In the optical fiber device of FIG. 1, a central fiber 11 of very low loss optical glass is surrounded by spacer fiber members 12, 13, 14 and 15, also of very low loss optical glass. A vacuum-tight containing member 16 is substantially conformed to the adjacent surfaces of the spacer fiber members 12 through 15 and preferably comprises a glass including intentionally added optical absorbing impurities in order to isolate optically the contained fiber 11 and members 12 through 15 from the surrounding environment.

The assembly of the device of FIG. 1 deforms central fiber 11, originally circular in cross section as shown dotted, so that it approaches a rectangular shape. The essential aspect of the finished shape of fiber 11 is that it is of differing dimensions in orthogonal coordinates. More broadly, fiber 11 and spacer members 12 through 15 are adapted to have an asymmetric relationship in orthogonal coordinates.

The asymmetric relationship in orthogonal coordinates insures single-mode transmission of a modulated light beam, as shown in FIG. 2, between a communication transmitter 21 and a receiver 22. The optical fiber device 23 is illustratively the device shown in cross section in FIG. 1. The transmitter 21, which may be of any type known in the optical communication art, transmits a modulated light beam in the lowest order transverse, or Gaussian, mode. Communication receiver 22 is of any type known in the optical communication art. If it is to receive and demodulate the modulated light beam efficiently, the energy it receives should all be in the lowest order transverse mode. Higher order modes, to the extent they are generated by conversion during transmission and subsequently reconverted to the signal mode with arbitrary delay, represent "noise" or interference at the receiver 22. Therefore, if the central fiber of the optical fiber device 23 is capable only of single-mode transmission, no higher order modes will be received by receiver 22.

In addition to the asymmetric relationship described above, the central fiber 11 of FIG. 1 should have transverse dimensions very close to the wavelength of the light energy being transmitted. The diameters of spacer members 12 and 13 are illustratively approximately five times as great as the largest transverse dimension of fiber 11; and spacer members 14 and 15 preferably have transverse dimensions at least twice as large as the largest transverse dimension of fiber 11. Nevertheless, spacer members 14 and 15 should be of substantially different size from spacer members 12 and 13 in order that fiber 11 may be deformed asymmetrically, in this case to the essentially rectangular shape, during the drawing operation.

In operation, the transmitter 21 launches a single supportable Gaussian mode of modulated light into the optical fiber device 23, of the type shown in FIG. 1. The central fiber 11 contains most of the fields of the transmitted light, since it has a substantially higher index of refraction than the spacer fiber members 12 through 15. The outer portions of the fields do extend into members 12 through 15 to some degree. Nevertheless, fiber 11 is effective to determine what modes are supported in the fiber device.

After transmission through device 23, the modulated light, still in a single mode, is received and demodulated in receiver 22.

An analogous asymmetric relationship among a central fiber and the surrounding spacer fiber members suitable for single-mode transmission may be provided by unequal refractive indices of the spacer fiber members.

Such an embodiment is shown in FIG. 3. Here the central fiber 31 has been deformed to be essentially triangular. If the form of fiber 31 is essentially that of an equilateral triangular, it would not, in itself, provide single-mode transmission. Nevertheless, mode degeneracy is removed and single-mode transmission insured by providing that the spacer fiber member 33 has a higher index of refraction than spacer fiber members 32 and 32'. Specifically, the index of refraction of spacer fiber member 33 advantageously would be approximately midway between those of central fiber 31 and like spacer fiber members 32 and 32'.

Alternatively, mode degeneracy may be prevented in the embodiment of FIG. 3 by providing that one of the spacer fiber members is sufficiently larger in diameter than the other two, so that the central fiber 31 is deformed asymmetrically, for example, to a nonequilateral triangular shape, during the drawing operation. The drawing operation will be described hereinafter in connection with FIG. 4.

More specifically, central fibers 11 and 31 in FIGS. 1 and 3 illustratively may be drawn from rod-like material of index of refraction 1.58 and initial diameter 60 mils down to a final largest dimension of 1 micron. Spacer fiber members 12 through 15, 32 and 32' illustratively have an index of refraction of 1.52 and a starting diameter of 300 mils, except for members 14 and 15, which illustratively have starting diameters of 120 mils.

The containing members 16 and 36, respectively, illustratively have initial internal diameters of approximately 800 mils. Spacer fiber member 33 of FIG. 3 illustratively has an index of refraction of 1.55 and an initial diameter of 300 mils.

These assembled members are drawn in an apparatus such as shown in FIG. 4 until the desired final dimensions of the central fiber are attained and the containing member 16 or 36 has collapsed snugly thereover.

In the drawing apparatus of FIG. 4, a suitable supporting structure 41 disposes heating elements 42 about a region in which the fiber, spacer members, and containing member 16 or 36 are to be drawn. A pulling apparatus 43 establishes a tension on the assembly of fibers and containing member in the downward direction in FIG. 4 and a vacuum pump 44 evacuates essentially all gases from within the containing member 16 or 36. The members all become plastic in the region heated by heater elements 42 and neck down substantially under the influence of the tension established by pulling apparatus 43. The difference between inside and outside pressures causes the containing member 16 or 36 to collapse over the spacer fiber members to assume the final form shown in FIGS. 1 and 3. The plastic central fiber is also deformed by the more massive members pressing in about it. Although the spacer fiber members themselves may be slightly deformed, in a manner not shown, their deformation is not important to the invention so long as their index of refraction is sufficiently different from that of the central fiber and they continue to provide adequate structural strength for the finished assembly.

It will be immediately apparent to those skilled in the art that there are other combinations of supporting spacer fiber members for a center-fiber of higher refractive index. In any exent, a suitable asymmetric relationship in orthogonal coordinates will provide the desired single-mode transmission characteristic.

I claim:

1. An optical transmission medium of the type comprising a fiber of a first refractive index, a plurality of spacer members of a second refractive index lower than said first refractive index bound in surrounding relationship with said fiber, and a containing member disposed around and substantially conformed to said spacer members, said medium being improved for the purpose of communication in that at least one of said fiber and said spacer members provides an asymmetry of the optical propagation characteristics of said medium in orthogonal coordinates, said asymmetry being effective to suppress mode-degeneracy of the optical radiation to be propagated in said medium.

2. An optical transmission medium according to claim 1 in which the fiber provides the asymmetry in that the fiber has an asymmetric shape in orthogonal coordinates, said spacer members being unequally spaced from the axis of said fiber in orthogonal coordinates.

3. An optical transmission medium according to claim 2 in which the spacer members separate the fiber from the containing member by a distance substantially greater than the largest transverse dimension of the fiber.

4. An optical transmission medium according to claim 1 in which the spacer members provide the asymmetry in that at least one of said spacer members tangent to said fiber along one coordinate has a first index of refraction and another of said spacer members that extends into the orthogonal coordinate in proximity to said fiber has a second index of refraction different from said first index of refraction.

5. An optical fiber device according to claim 4 in which the spacer members separate the fiber from the containing member by a distance substantially greater than the largest transverse dimension of the fiber.

6. An optical transmission medium of the type comprising a fiber of a first refractive index and of approximately rectangular cross section having first and second differing dimensions along first and second respective sides, a plurality of spacer members of a second index of refraction less than said first index of refraction adjacent said fiber, and an optically-absorbing member containing said fiber and said plurality of spacer members, said plurality of spacer members having first and second unequal dimensions between said containing member and said first and second sides of said fiber.

7. An optical transmission medium of the type comprising a fiber of a first refractive index and of axially non-symmetrical cross section, a plurality of spacer members of second and third differing indices of refraction less than said first index of refraction adjacent said fiber, and an optically-absorbing member containing said fiber and said spacer members, said spacer members of said second and third indices of refraction respectively extending into orthogonal coordinates in proximity to said fiber.

References Cited
UNITED STATES PATENTS 3,278,283 10/1966 Bazinet.
3,350,654 10/1967 Snitzer.

JOHN K. CORBIN, Primary Examiner

U.S. Cl. X.R.

250—199